US012592987B2

(12) United States Patent
Khandelwal et al.

(10) Patent No.: US 12,592,987 B2
(45) Date of Patent: *Mar. 31, 2026

(54) PATH VISIBILITY, PACKET DROP, AND LATENCY MEASUREMENT WITH SERVICE CHAINING DATA FLOWS

(71) Applicant: Cisco Technology, Inc., San Jose, CA (US)

(72) Inventors: Sonu Kumar Khandelwal, Milpitas, CA (US); Hasmit S. Grover, Fremont, CA (US); Sundeep Singam Setty, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/863,672

(22) Filed: Jul. 13, 2022

(65) Prior Publication Data

US 2022/0353191 A1 Nov. 3, 2022

Related U.S. Application Data

(63) Continuation of application No. 16/918,658, filed on Jul. 1, 2020, now Pat. No. 11,418,453.

(51) Int. Cl.
*H04L 69/22* (2022.01)
*H04L 43/0852* (2022.01)
(Continued)

(52) U.S. Cl.
CPC .......... *H04L 69/22* (2013.01); *H04L 43/0852* (2013.01); *H04L 43/106* (2013.01); *H04L 47/2441* (2013.01); *H04L 47/34* (2013.01)

(58) Field of Classification Search
CPC ............. H04L 47/2441; H04L 43/0852; H04L 43/106; H04L 45/745; H04L 47/34; H04L 69/22
See application file for complete search history.

(56) References Cited

U.S. PATENT DOCUMENTS 6,707,821 B1 3/2004 Shaffer et al.
11,418,453 B2 * 8/2022 Khandelwal .......... H04L 43/106
(Continued)

FOREIGN PATENT DOCUMENTS

CN 105706044 A 6/2016
CN 105706420 A 6/2016
(Continued)

OTHER PUBLICATIONS

Office Action for U.S. Appl. No. 16/918,658, mailed on Nov. 24, 2021, Khandelwal, "Path Visibility, Packet Drop, and Latency Measurement with Service Chaining Data Flows", 10 pages.
(Continued)

*Primary Examiner* — Kibrom T Hailu
(74) *Attorney, Agent, or Firm* — Lee & Hayes, P.C.

(57) ABSTRACT

Techniques for determining packet path visibility, packet drops, and latency measurements associated with data flows of a networked computing environment are disclosed herein. The techniques may include receiving flow data associated with a data flow of a networked computing environment and determining a packet path associated with the data flow. The packet path may indicate that a first leaf switch is configured to send packets to a service chain device and that a second leaf switch is configured to receive the packets from the service chain device. The techniques may also include receiving timestamp data indicating a first time when the first leaf switch sent a packet to the service chain device and a second time when the second leaf switch received the packet from the service chain device. Based at least in part on the timestamp data, a latency associated with the service chain device may be calculated.

20 Claims, 8 Drawing Sheets

(51) Int. Cl.
    *H04L 43/106*     (2022.01)
    *H04L 47/2441*     (2022.01)
    *H04L 47/34*     (2022.01)

(56)          References Cited

U.S. PATENT DOCUMENTS

| | | |
|---|---|---|
| 2008/0225713 A1 | 9/2008 | Tychon et al. |
| 2015/0085852 A1 | 3/2015 | Mizutani et al. |
| 2015/0089082 A1 | 3/2015 | Patwardhan et al. |
| 2015/0124640 A1 | 5/2015 | Chu et al. |
| 2016/0050131 A1* | 2/2016 | Zhang .................... H04L 45/38 370/244 |
| 2016/0149788 A1* | 5/2016 | Zhang ................. H04L 43/0829 709/224 |
| 2016/0285720 A1 | 9/2016 | Maenpaa et al. |
| 2017/0078176 A1* | 3/2017 | Lakshmikantha ...... H04L 45/64 |
| 2018/0034712 A1 | 2/2018 | Nainar et al. |
| 2018/0311931 A1 | 11/2018 | Wodzinski et al. |
| 2018/0331931 A1 | 11/2018 | Holness |
| 2019/0190804 A1 | 6/2019 | Tang et al. |
| 2019/0349268 A1* | 11/2019 | Pai ........................ H04M 15/00 |
| 2022/0006747 A1 | 1/2022 | Khandelwal et al. |

FOREIGN PATENT DOCUMENTS

| | | |
|---|---|---|
| CN | 110521169 A | 11/2019 |
| WO | WO2020029097 A1 | 2/2020 |

OTHER PUBLICATIONS

The Search Report and Written Opinion for PCT Application No. PCT/US21/38947, mailed Oct. 6, 2021.
The International Preliminary Report on Patentability mailed Jan. 12, 2023, for PCT Application No. PCT/US21/38947, 12 pages.

* cited by examiner

300 —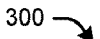

RECEIVE, FROM AN INGRESS LEAF SWITCH OF A NETWORKED COMPUTING ENVIRONMENT, FIRST TIMESTAMP DATA INDICATING A FIRST TIME AT WHICH A PACKET ENTERED A DATA FLOW OF THE NETWORKED COMPUTING ENVIRONMENT
302

RECEIVE, FROM A FIRST INTERMEDIARY LEAF SWITCH IN THE NETWORKED COMPUTING ENVIRONMENT, FIRST FLOW DATA ASSOCIATED WITH THE DATA FLOW
304

DETERMINE, BASED AT LEAST IN PART ON THE FIRST FLOW DATA, THAT THE FIRST INTERMEDIARY LEAF SWITCH IS CONFIGURED TO EXPORT THE PACKET TO A SERVICE CHAIN DEVICE LOCATED OUTSIDE OF THE NETWORKED COMPUTING ENVIRONMENT
306

RECEIVE, FROM A SECOND INTERMEDIARY LEAF SWITCH IN THE NETWORKED COMPUTING ENVIRONMENT, SECOND FLOW DATA ASSOCIATED WITH THE DATA FLOW
308

DETERMINE, BASED AT LEAST IN PART ON THE SECOND FLOW DATA, THAT THE SECOND INTERMEDIARY LEAF SWITCH RECEIVED THE PACKET AS IT RETURNED BACK INTO THE NETWORKED COMPUTING ENVIRONMENT FROM THE SERVICE CHAIN DEVICE
310

RECEIVE, FROM AN EGRESS LEAF SWITCH OF THE NETWORKED COMPUTING ENVIRONMENT SECOND TIMESTAMP DATA INDICATING A SECOND TIME AT WHICH THE PACKET EXITED THE DATA FLOW OF THE NETWORKED COMPUTING ENVIRONMENT
312

CALCULATE A LATENCY ASSOCIATED WITH THE PACKET TRAVERSING THE DATA FLOW OF THE NETWORKED COMPUTING ENVIRONMENT BASED AT LEAST IN PART ON THE FIRST TIMESTAMP DATA AND THE SECOND TIMESTAMP DATA
314

FIG. 3

400

RECEIVE, FROM A FIRST LEAF SWITCH OF A NETWORKED COMPUTING ENVIRONMENT, FIRST FLOW DATA THAT IS ASSOCIATED WITH A DATA FLOW
402

RECEIVE, FROM A SECOND LEAF SWITCH OF THE NETWORKED COMPUTING ENVIRONMENT, SECOND FLOW DATA THAT IS ASSOCIATED WITH THE DATA FLOW
404

DETERMINE, BASED AT LEAST IN PART ON THE FIRST FLOW DATA AND THE SECOND FLOW DATA, A PACKET PATH THAT IS ASSOCIATED WITH THE DATA FLOW, THE PACKET PATH INDICATING THAT THE FIRST LEAF SWITCH IS CONFIGURED TO SEND PACKETS TO A SERVICE CHAIN DEVICE AND THAT THE SECOND LEAF SWITCH IS CONFIGURED TO RECEIVE THE PACKETS FROM THE SERVICE CHAIN DEVICE
406

RECEIVE, FROM THE FIRST LEAF SWITCH, FIRST TIMESTAMP DATA INDICATING A FIRST TIME AT WHICH A PACKET WAS SENT TO THE SERVICE CHAIN DEVICE
408

RECEIVE, FROM THE SECOND LEAF SWITCH, SECOND TIMESTAMP DATA INDICATING A SECOND TIME AT WHICH THE PACKET WAS RECEIVED FROM THE SERVICE CHAIN DEVICE
410

CALCULATE A LATENCY ASSOCIATED WITH THE SERVICE CHAIN DEVICE BASED AT LEAST IN PART ON THE FIRST TIMESTAMP DATA AND THE SECOND TIMESTAMP DATA
412

FIG. 4

PATH VISIBILITY, PACKET DROP, AND LATENCY MEASUREMENT WITH SERVICE CHAINING DATA FLOWS

CROSS-REFERENCE TO RELATED APPLICATION

This patent application is a continuation of and claims priority to U.S. patent application Ser. No. 16/918,658, filed Jul. 1, 2020, which is fully incorporated herein by reference.

TECHNICAL FIELD

The present disclosure relates generally to determining packet path visibility, packet drops, and latency measurements associated with data flows of a networked computing environment, such as a data center switching fabric, that utilizes service chaining.

BACKGROUND

Networked computing environments, such as data center switching fabrics, often include various hardware and software devices, such as switches, routers, server computers, network nodes, and the like. These devices may be utilized to establish data flows within the networked computing environment for routing data packets from one network to another network. Additionally, these networked computing environments often host critical applications such as Internet of Things (IOT) applications, connected cars, gaming, high-bandwidth internet, etc. As these applications begin to utilize faster network speeds, such as 5G, it is critical to determine whether specific nodes and/or devices of a data flow are causing packet drops and/or latencies for the applications. However, because these applications generally have very complex service chaining requirements, which includes sending packets to service chain devices located outside of the networked computing environment, it is difficult to calculate latencies for specific nodes and/or devices, as well as to determine whether a specific node and/or device is dropping packets.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for determining a latency associated with a packet traversing a data flow of a networked computing environment that utilizes service chaining.

FIG. 4 illustrates a flow diagram of an example method for determining a latency associated with a service chain device.

DESCRIPTION OF EXAMPLE EMBODIMENTS

Overview

Figure 1:
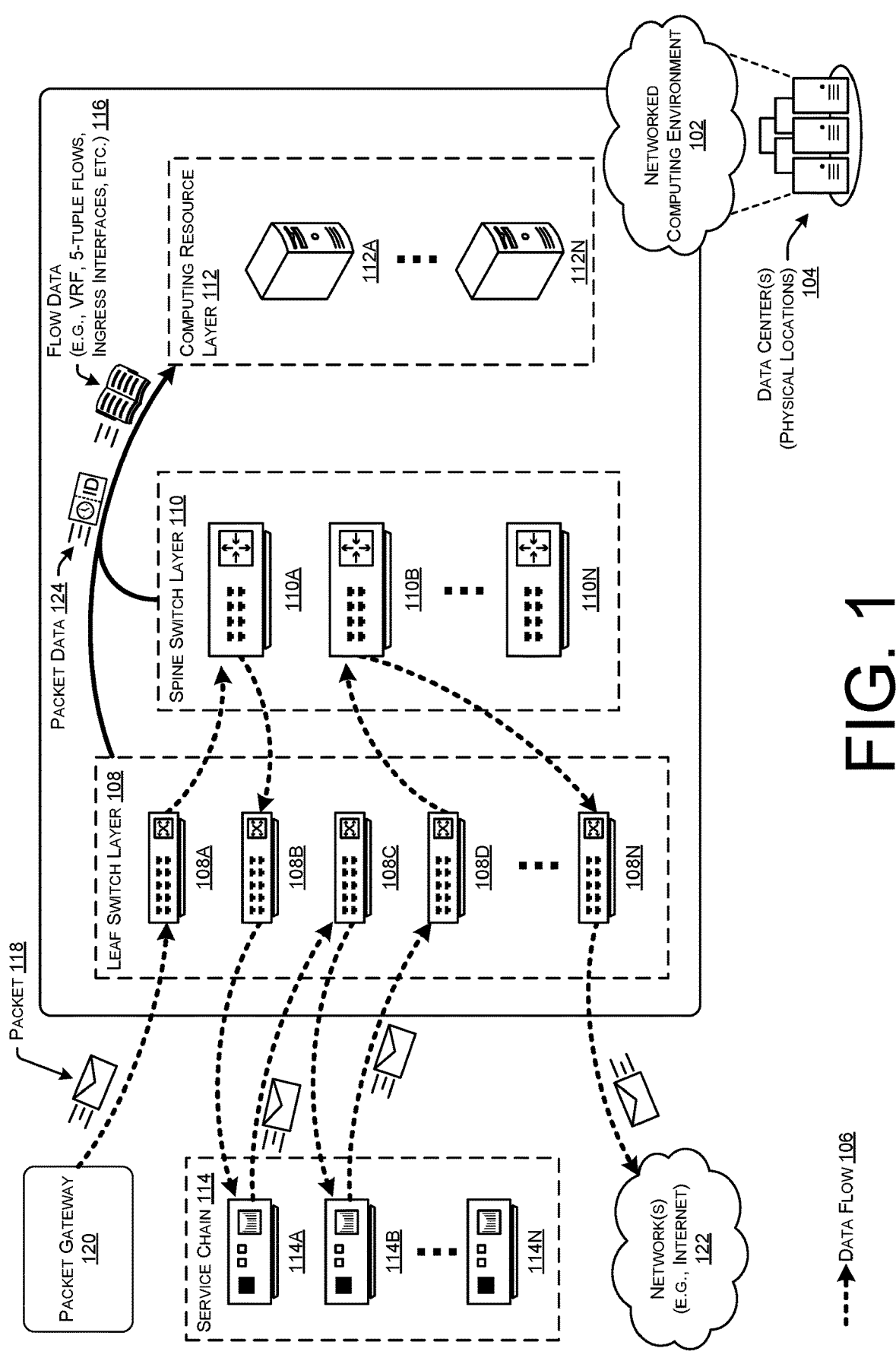
FIG. 1 illustrates a system-architecture diagram of an example networked computing environment. As shown, the data flow of the networked computing environment utilizes service chaining.

This disclosure describes techniques for determining packet path visibility, packet drops, and latency measurements associated with data flows of a networked computing environment that utilizes service chaining. Some of the techniques described in this disclosure may include receiving, from one or more leaf switches of a networked computing environment, flow data (e.g., 5-tuple flow data, a virtual routing and forwarding table (VRF), ingress and/or egress physical interface data, ingress and/or egress logical interface data, service chaining configuration data, and the like) that is associated with a data flow. Based at least in part on the flow data, a packet path that is associated with the data flow may be determined. Among other things, the packet path may indicate that a first leaf switch of the one or more leaf switches is configured to send packets to a service chain device and that a second leaf switch of the one or more leaf switches is configured to receive the packets from the service chain device. In examples, the service chain device is located outside of the networked computing environment. In this way, by using the flow data received from the one or more leaf switches, packet path visibility may be determined for data flows of a networked computing environment that utilize service chaining, thus resulting in an improvement in computing technology related to network visibility and troubleshooting.

Additionally, the techniques described in this disclosure may include receiving first timestamp data indicating a first time at which the first leaf switch sent a packet to the service chain device. The techniques may also include receiving second timestamp data indicating a second time at which the second leaf switch received the packet from the service chain device. In this way, a latency associated with the service chain device may be calculated based at least in part on the first timestamp data and the second timestamp data. Thus, by utilizing at least some of the techniques described herein, latencies may be determined for devices that are not located within a networked computing environment (e.g., a datacenter switching fabric).

The techniques described herein may further include receiving, from an ingress leaf switch of a networked computing environment, first timestamp data indicating a first time at which a packet entered the networked computing environment. Additionally, second timestamp data indicating a second time at which the packet exited the networked computing environment may be received from an egress leaf switch of the networked computing environment. In this way, a latency associated with the packet traversing the networked computing environment may be calculated based at least in part on the first timestamp data and the second timestamp data.

The techniques described in this disclosure may be performed as a method and/or by a system having non-transitory computer-readable media storing computer-executable instructions that, when executed by one or more processors, performs the techniques described above.

EXAMPLE EMBODIMENTS

As discussed above, when networked computing environments host critical applications, such as 5G, it is important to determine whether specific nodes and/or devices of a data flow are causing packet drops and/or latencies for the applications. However, because these applications generally have very complex service chaining requirements, which includes sending packets to service chain devices (e.g., firewalls, Transmission Control Protocol (TCP) optimizers, Carrier Grade Network Address Translation (CGNAT), parental control, deep packet inspection (DPI), load balancers, and the like) located outside of the networked computing environment, it is difficult to calculate latencies for specific nodes and/or devices, as well as to determine whether a specific node and/or device is dropping packets.

For instance, if any device in a data flow causes more latency or packet drops, it may cause downtime for a 5G application that is hosted by the networked computing environment, thereby causing revenue impacts to service providers. Traditionally, latency and/or packet drops may be determined based at least in part on using a packet header of a specific packet as it traverses a data flow of a networked computing environment. The packet header may include timestamp data, 5-tuple flow data (including, for example, a source internet protocol (IP) address, destination IP address, protocol, source Layer 4 (L4) port, and destination L4 port), a TCP sequence number, an identification field, and the like. However, when a data flow includes an external service chain device, this packet header is lost when the packet is sent outside of the networked computing environment (e.g., data center switching fabric) to the service chain device. Additionally, using the flow information stored in the packet header alone, it is not possible to determine whether a packet is entering the networked computing environment for the first time or if it is coming back into the networked computing environment from the service chain device, thereby furthering the difficulty of determining end-to-end latency, service device latency, and packet drops.

Accordingly, this disclosure describes techniques for determining packet path visibility, packet drops, and latency measurements associated with data flows of a networked computing environment that utilizes service chaining. As used herein, the term "networked computing environment" may include a data center fabric, a cloud computing network, and the like. Additionally, a networked computing environment may include a building, dedicated space within a building, or a group of buildings in a single, physical location, or spread out between a plurality of physical locations, that is used to house computer systems and associated components, such as telecommunications and storage systems. The networked computing environment may include one or more leaf switches, spine switches, computing resources, data stores, routers, gateways, etc.

As used herein, the term "data flow" means a packet path that traverses a networked computing environment by routing packets through one or more specific devices of the networked computing environment such as leaf switches, spine switches, and the like. Additionally, a packet path of a data flow may route packets outside of a data center switching fabric to one or more service chain devices, which are located outside of the data center fabric. In various examples, a networked computing environment may include a plurality of data flows that each traverse through one or more different devices. For instance, a first data flow may include a first, ingress leaf switch that receives packets into a datacenter fabric and a second data flow may include a second, ingress leaf switch that also receives packets into the datacenter fabric. Additionally, the first data flow may include a third, egress leaf switch that sends packets to a service chain device located outside of the datacenter fabric, while the second data flow may include a fourth, egress leaf switch that also sends packets to the service chain device located outside of the datacenter fabric.

Additionally, as used herein, the term "flow data" may include telemetry data that is associated with a data flow. For instance, flow data may include one or more of 5-tuple flow data, a virtual routing and forwarding table (VRF), switch ingress physical interface data, switch egress physical interface data, switch ingress logical interface data, switch egress logical interface data, and the like. In various examples, and as further discussed below, flow data may be used to identify a packet path of one or more data flows of a networked computing environment (e.g., by determining next hops of a data flow with respect to specific devices when a packet is received).

By way of example and not limitation, a method according to the techniques described herein may include receiving, from a first leaf switch of a networked computing environment, first flow data that is associated with a data flow. The networked computing environment may include one or more leaf switches, one or more spine switches, one or more computing resources, and the like. Additionally, the data flow may traverse or otherwise pass through one or more physical devices and/or logical devices of the networked computing environment in order to route packets through the networked computing environment. In some examples, the first flow data may include one or more of 5-tuple flow data, a virtual routing and forwarding table (VRF), ingress and/or egress physical interface data, ingress and/or egress logical interface data, etc. Additionally, the method may also include receiving, from a second leaf switch of the networked computing environment, second flow data that is associated with the data flow. Like the first flow data mentioned above, the second flow data may include one or more of 5-tuple flow data, a VRF, ingress and/or egress physical interface data, ingress and/or egress logical interface data, etc.

In some examples, based at least in part on the first flow data and the second flow data, the method may include determining a packet path that is associated with the data flow. The packet path may indicate, among other things, that the first leaf switch is configured to send packets to a service chain device and that the second leaf switch is configured to receive the packets from the service chain device. In various examples, the service chain device may be located outside of the networked computing environment and may comprise a firewall, TCP optimizers, CGNAT, parental control, DPI, load balancers, and the like. Additionally, the packet path may indicate one or more other leaf switches, one or more spine switches, and/or one or more other devices that are associated with the data flow.

In some examples, service chaining configuration data may be received for the first leaf node and the second leaf node, as well as other switches and/or devices of the networked computing environment. For instance, if the networked computing environment is configured in an Application Centric Infrastructure (ACI) mode, then the service chaining configuration data may include contract, filter, and service graph configuration data that is received from an Application Policy Infrastructure Controller (APIC). Additionally, or alternatively, if the networked computing environment is configured in a non-ACI mode, then the service chaining configuration data may include policy-based routing (PBR) and routing protocol configuration data that defines the service chain path for a given data flow. In at least one example, determining the packet path that is associated with the data flow may be further based at least in part on the service chaining configuration data. The service chaining configuration may indicate that the first leaf switch is configured to export packets to the service chain device and that the second leaf switch is configured to receive packets back into the networked computing environment from the service chain device.

The method may also include receiving, from the first leaf switch, first timestamp data indicating a first time at which a packet was sent to the service chain device. The first timestamp data may be included in a first packet header of the packet. The first packet header may additionally include packet identification data associated with the packet, such as 5-tuple data, a TCP sequence number, and the like. In some examples, the method may include receiving the packet identification data associated with the packet. In this way, the packet may be tracked when it re-enters the networked computing environment from the service chain device as further discussed below.

In various examples, the method includes receiving, from the second leaf switch, second timestamp data indicating a second time at which the packet was received from the service chain device. The second timestamp data may be included in a second packet header of the packet that is different than the first packet header. For instance, as noted above, when the packet leaves the networked computing environment when it is sent to the service chain device by the first leaf switch, the packet may lose its original (e.g., first) packet header which includes the first timestamp data. Additionally, when the packet re-enters the networked computing environment from the service chain device, it may include a new (e.g., second) packet header which includes the second timestamp data. Accordingly, in some examples the method includes determining, based at least in part on the packet identification data, that the second leaf switch received the packet from the service chain device, and associating the second timestamp data with the packet.

In some examples, the method includes calculating a latency associated with the service chain device based at least in part on the first timestamp data and the second timestamp data. For instance, a difference between a first point and time associated with the first timestamp data and a second point in time associated with the second timestamp data may be calculated, and the difference may indicate the latency associated with the service chain device. In various examples, the latency associated with the service chain device may comprise a first latency, and the method may also include calculating an end to end latency associated with the packet traversing the data flow of the networked computing environment. For instance, calculating the end to end latency may be based at least in part on the first latency associated with the service chain device, as well as receiving (i) third timestamp data indicating a second latency associated with the first leaf switch, (ii) fourth timestamp data indicating a third latency associated with the second leaf switch. In this way, the end to end latency may be a sum of the first latency, the second latency, and the third latency. Additionally, it is contemplated that end to end latency for a data flow, as well as individual latencies associated with specific devices of the data flow, may be calculated for a data flow that includes a plurality of each of leaf switches, spine switches, service chain devices, etc.

The techniques described herein, including the example method described above, may be performed by software, hardware, or a combination thereof. For instance, the techniques described herein may be performed by software executing on a central agent (e.g., computing resource, server computer, etc.) of a networked computing environment, by a switch of the networked computing environment, such as a spine switch and/or a leaf switch, and the like. By performing some or all of the techniques described in this disclosure, packet path visibility, latency, and packet drop associated with data flows of a networked computing environment may be more easily determined. In this way, service providers may use these various techniques to enhance the reliability and efficiency of their systems by at least decreasing latencies and determining where faults may be occurring, thereby resulting in an improvement to system monitoring techniques for networked computing environments that utilize service chaining.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example networked computing environment 102. As shown, the data flow 106 of the networked computing environment utilizes service chaining. Generally, the networked computing environment 102 may include devices that are housed or located in one or more data centers 104 that may be located at different physical locations. For instance, the networked computing environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 includes various computing devices, such as a leaf switch layer 108 including one or more leaf switches 108A-108N (where N represents any number greater than or equal to one), a spine switch layer 110 including one or more spine switches 110A-110N (where N represents any number greater than or equal to one), and a computing resource layer 112 including one or more computing resources 112A-112N (where N represents any number greater than or equal to one). The leaf switches 108A-108N, the spine switches 110A-110N, and the computing resources 112A-112N may be communicatively coupled to one another via one or more wired and/or wireless connections. In this way, data may be communicated back and forth between the various computing devices of the leaf switch layer 108, spine switch layer 110, and the computing resource layer 112. Additionally, the one or more leaf switches 108A-108N, the one or more spine switches 110A-110N, and/or the one or more computing resources 112A-112N may be able to communicate with the one or more service chain devices 114A-114N of service chain 114.

In some examples, software executing on the computing resource layer 112 may determine a packet path associated with data flow 106, as shown in FIG. 1 with broken lines. For instance, the computing resource layer may receive flow data 116 from the various computing devices of the leaf switch layer 108 and the spine switch layer 110. This flow data 116 may include one or more of a VRF, 5-tuple flow data, ingress and/or egress physical interface data, ingress and/or egress logical interface data, and the like. Based at least in part on the flow data 116, the software executing on the computing resource layer 116 may determine the packet path associated with data flow 106. By way of example, and as shown in FIG. 1, the software executing on the computing resource layer 112 may determine that leaf switch 108A is configured to receive packets of data flow 106, such as packet 118, from packet gateway 120 and then forward those packets to spine switch 110A. In turn, spine switch 110A will receive the packets of data flow 106 and then forward those packets to leaf switch 108B. Additionally, based at least in part on the flow data 116 and service chain configuration data, the software executing on the computing resource layer 112 may determine that leaf switch 108B is configured to send packets of data flow 106 to service chain device 114A, and that leaf switch 108C is configured to receive the packets of data flow 106 from service chain device 114A. When leaf switch 108C receives packets of data flow 106, then it is configured to send those packets to service chain device 114B. The software executing on the computing resource layer 112 may also determine that leaf switch 108D is configured to receive packets of data flow 106 from service chain device 114B and then forward those packets to spine switch 110B. Finally, the software may determine that spine switch 110B is configured to receive the packets of data flow 106 from leaf switch 108D, forward those packets to leaf switch 108N, and then leaf switch 108N is configured to forward those packets to one or more networks 122, such as the internet. In this way, software executing on the computing resource layer 112 can determine packet paths of data flows in the networked computing environment. Additionally, and although it is shown in FIG. 1 that the software is executing on the computing resource layer 112 to determine packet paths of data flows, it is contemplated that the software can be executing on other hardware resources of the networked computing environment, such as the leaf switch layer 108, the spine switch layer 110, other devices not shown, and/or a combination thereof.

In some examples, the software executing on the computing resource layer 112 may determine latencies and/or packet drops associated with packets, such as packet 118, traversing the data flow 106 of the networked computing environment 102. For instance, based at least in part on determining the packet path of data flow 106 as discussed above, software executing on the computing resource layer 112 may receive packet data 124 that is associated with packet 118 each time the packet 118 is received and/or sent by one of the leaf switches 108A-108N and/or the spine switches 110A-110N. This packet data 124 may include timestamp data and at least one of a TCP sequence number, a 5-tuple flow (e.g., including a source IP address, destination IP address, protocol, source L4 port, and destination L4 port), an IP header identification field, and/or the like. Using this packet data 124, the software can track the packet 118 as it traverses the data flow 106 of the networked computing environment and calculate latencies for each device that sends and/or receives the packet 118, even though the IP header of the packet 118 changes when it is sent to the service chain 114.

For instance, when leaf switch 108B sends the packet 118 to service chain device 114A, the packet 118 will lose its IP header, including timestamp data. In this way, when leaf switch 108C receives the packet 118 back from the service chain device 114A, the timestamp data of the packet 118 IP header will be different. However, at least one of the TCP sequence number, and/or the IP header identification field will remain the same. Thus, exporting this packet data 124 to the computing resource layer 112 allows the software to recognize when the packet 118 re-enters the networked computing environment 102. For example, when leaf switch 108B sends the packet 118 to service chain device 114A, leaf switch 108B will also send the packet data 124, which includes the egress timestamp data, to the computing resource layer 112. Additionally, when leaf switch 108C receives the packet 118 from the service chain device 114A, the leaf switch 108C will send the packet data 124, which includes the ingress timestamp data, to the computing resource layer 112. In this way, by using the egress timestamp data and the ingress timestamp data, a latency can be calculated that is associated with sending the packet to service chain device 114A. This similar operation may be performed each time the packet 118 is sent to a device of the service chain 114.

Additionally, latencies can be determined for each device of the networked computing environment 102 that is a part of the data flow 106. In some examples, determining latencies associated with the devices of the networked computing environment may be based at least in part on at least one of determining the packet path of the data flow 106, the packet data 124, the flow data 116, a combination thereof, and the like. By calculating latencies for each device of the networked computing environment that is part of the data flow 106, as well as for each of the service chain devices that are also part of the data flow 106, end-to-end latency of the packet 118 traversing the data flow 106 can be calculated by summing all of the latencies associated with the various devices of the data flow 106.

In some examples, latencies can be determined for service chain devices 114A-114N by sending a unique packet with special TCP ports from a source leaf switch to a destination leaf switch via a service chain device (e.g., from leaf switch 108B to service chain device 114A, and then from service chain device 114A to leaf switch 108C). This unique packet may be sent at a regular time interval (e.g., once every second, 10 seconds, 30 seconds, minute, 10 minutes, and so forth) to ensure that the service chain device is not dropping packets or causing longer than expected latencies. In various examples, the unique packet may comprise a packet configuration that all switches can be enabled to handle to measure latency and determine packet paths of data flows. Each egress and ingress switch connected to a service chain device can export flow information, and timestamp of this unique packet. Since this is a unique injected packet, software executing on a central agent, such as a computing resource, can collect the timestamp of this packet from the egress switch before sending it to a service chain device. Similarly, it can collect the timestamp of this packet from the ingress switch after the ingress switch receives the packet from the service chain device. In examples, a time difference between these timestamps will be the latency caused by each service chain device.

Figure 2A:
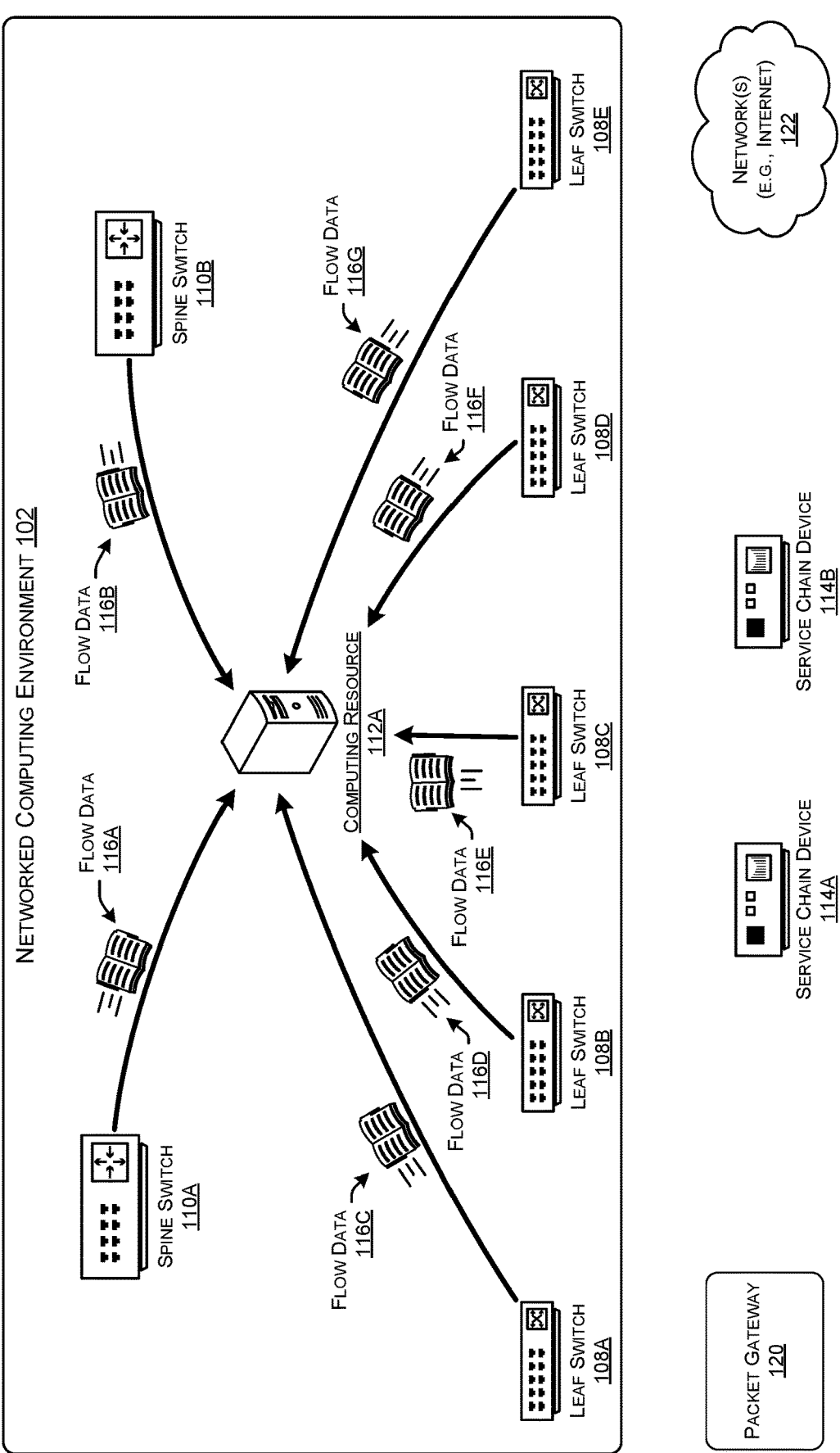
FIGS. 2A-2C collectively illustrate a flow diagram of an example process for determining path visibility, packet drops, and/or latency of a networked computing environment data flow that utilizes service chaining.
Figure 2B:
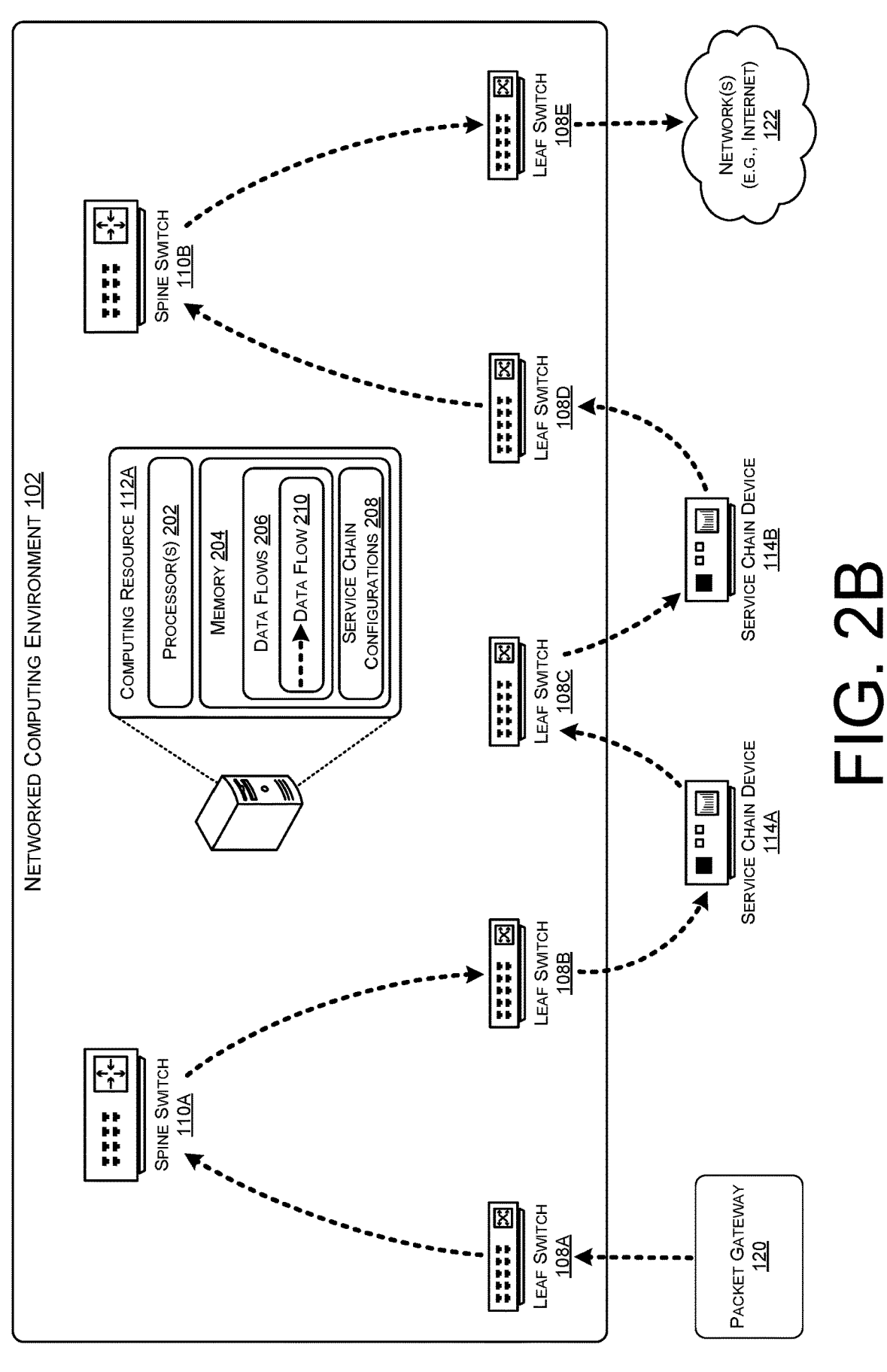
Figure 2C:
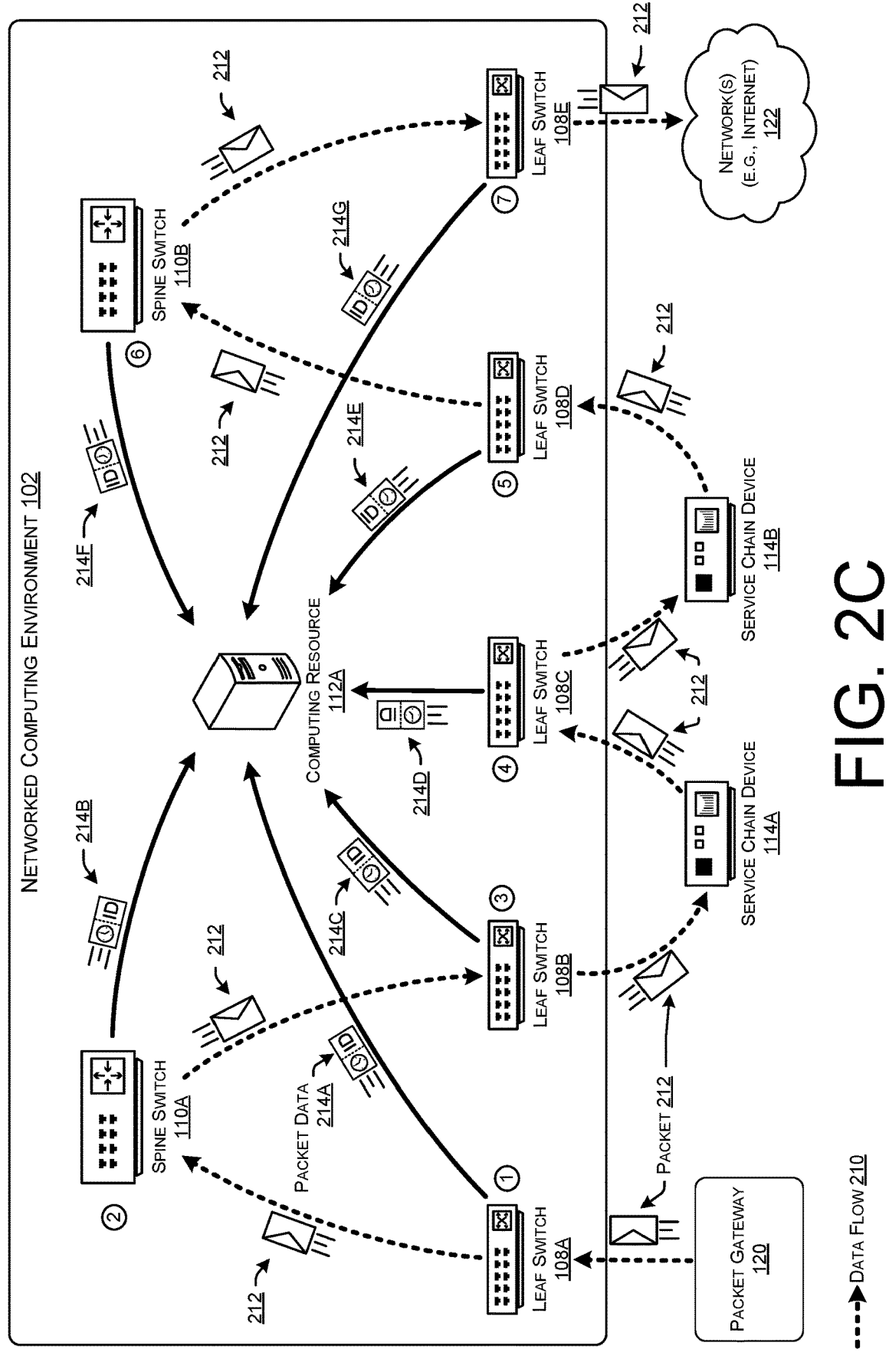

FIGS. 2A-2C collectively illustrate a flow diagram of an example process for determining path visibility, packet drops, and/or latency of a networked computing environment data flow that utilizes service chaining.

The process begins in FIG. 2A, in which the leaf switches 108A-108E and the spine switches 110A and 110B send flow data 116A-116G to the computing resource 112A. In some examples, the flow data 116A-116G may include one or more of a VRF table associated with each device, 5-tuple flow data, ingress and/or egress physical interface data associated with each device, ingress and/or egress logical interface data associated with each device, next-hop information, and the like. Additionally, in the case of an ACI based networked computing environment 102 fabric, the computing resource 112A may also receive a service chain contract, filter, and service graph from an APIC controller that defines the service chain path in ACI mode for a given flow. Alternatively, in the case of a non-ACI based networked computing environment 102 fabric, the computing resource 112A may receive PBR and routing protocol configuration data that defines the service chain path for a given flow.

Accordingly, using some or all of the flow data 116A-116G information described above, in FIG. 2B a packet path of a data flow 210 (shown in broken lines) is determined by software and/or hardware that is executing on the computing resource 112A. In this example, the packet path of data flow 210 begins at leaf switch 108A where packets may be received from a packet gateway 120. Next, leaf switch 108A will forward packets associated with data flow 210 to the spine switch 110A, and the spine switch 110A will, in turn, forward packets of data flow 210 to leaf switch 108B. Once at leaf switch 108B, packets of data flow 210 will be sent outside of the networked computing environment 102 to service chain device 114A, and leaf switch 108C will receive packets of data flow 210 back into the networked computing environment from service chain device 114A. Next, once packets of data flow 210 are at leaf switch 108C, the packets will then be sent again outside of the networked computing environment 102 to service chain device 114B and later received back into the networked computing environment 102 by leaf switch 108D. Next, leaf switch 108D will then forward packets of data flow 210 to spine switch 110B, and spine switch 110B will, in turn, forward those packets to leaf switch 108E. Finally, leaf switch 108E will send the packets of data flow 210 outside of the networked computing environment 102 to one or more destination networks 122, such as the internet.

In some examples, the computing resource 112A may include processor(s) 202 and memory 204. The processor(s) 202 may comprise one or more cores. Additionally, the processor(s) may comprise a single processor or one or more processors. By way of example, and not limitation, the memory 204 can include computer-readable storage media that is volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The memory 204 may store one or more data flows 206, including data flow 210, as well as service chain configurations 208.

Turning to FIG. 2C, based at least in part on determining the packet path of the data flow 210, one or more latencies can now be calculated for individual segments and/or devices, including multiple segments and/or devices, of the data flow 210.

At "1", leaf switch 108A receives the packet 212 of data flow 210 from the packet gateway 120 and forwards the packet 212 to spine switch 110A. The leaf switch 108A may, in various examples, send packet data 214A that is associated with the packet 212 to the computing resource 112A. The computing resource 112A may store the packet data 214A. The packet data 214A may include timestamp data (e.g., ingress and egress timestamp data for leaf switch 108A) and at least one of a TCP sequence number, a 5-tuple flow, an IP header identification field, and/or the like. Using at least the timestamp data, a latency may be calculated for the leaf switch 108A. The latency may indicate an amount of time it took for leaf switch 108A to process and forward the packet to spine switch 110A.

At "2", spine switch 110A receives the packet 212 of data flow 210 from the leaf switch 108A and forwards the packet 212 to leaf switch 108B. The spine switch 110A may, in various examples, send packet data 214B that is associated with the packet 212 to the computing resource 112A. The computing resource 112A may store the packet data 214B. The packet data 214B may include timestamp data (e.g., ingress and egress timestamp data for spine switch 110A) and at least one of a TCP sequence number, a 5-tuple flow, an IP header identification field, and/or the like. Using at least the timestamp data, a latency may be calculated for the spine switch 110A. The latency may indicate an amount of time it took for spine switch 110A to process and forward the packet to leaf switch 108B and/or may include the amount of time since the packet entered the networked computing environment on leaf switch 108A. The latency may be calculated by determining a difference between a local time when spine switch 110A received the packet and the timestamp value of when the packet entered the networked computing environment on leaf switch 108A.

At "3", leaf switch 108B receives the packet 212 of data flow 210 from the spine switch 110A and exports the packet 212 outside of the networked computing environment to service chain device 114A. The leaf switch 108B may, in various examples, send packet data 214C that is associated with the packet 212 to the computing resource 112A. The computing resource 112A may store the packet data 214C. The packet data 214C may include timestamp data (e.g., ingress and egress timestamp data for leaf switch 108B) and at least one of a TCP sequence number, a 5-tuple flow, an IP header identification field, and/or the like. Using at least the timestamp data, a latency may be calculated for the leaf switch 108B. The latency may indicate an amount of time it took for leaf switch 108B to process and export the packet to service chain device 114A and/or may include the amount of time since the packet entered the networked computing environment on leaf switch 108A. The latency may be calculated by determining a difference between a local time when leaf switch 108B received the packet and the timestamp value of when the packet entered the networked computing environment on leaf switch 108A.

At "4", leaf switch 108C receives the packet 212 of data flow 210 from service chain device 114A and exports the packet 212 outside of the networked computing environment 102 to service chain device 114B. The leaf switch 108C may, in various examples, send packet data 214D that is associated with the packet 212 to the computing resource 112A. The computing resource 112A may store the packet data 214D. The packet data 214D may include timestamp data (e.g., ingress and egress timestamp data for leaf switch 108B) and at least one of a TCP sequence number, a 5-tuple flow, an IP header identification field, and/or the like.

When the packet 212 is received by leaf switch 108C, the packet 212 may comprises a new packet header without the original timestamp information. However, based at least in part on the stored packet data 214C and the stored packet data 214D, the computing resource 112A may determine that the packet 212 that was received by the leaf switch 108C is the same packet 212 that was exported by leaf switch 108B, even though the IP header has changed. Accordingly, using at least the egress timestamp from stored packet data 214C (egress timestamp of leaf switch 108B) and the ingress timestamp from stored packet data 214D (ingress timestamp of leaf switch 108C), the computing resource 112A may determine a latency of the path associated with the service chain device 114A for the packet 212. Additionally, using at least the timestamp data from packet data 214D, a latency may be calculated for the leaf switch 108C. The latency may indicate an amount of time it took for leaf switch 108C to process and export the packet to service chain device 114B.

At "5", leaf switch 108D receives the packet 212 of data flow 210 from service chain device 114B and forwards the packet 212 to spine switch 110B. The leaf switch 108D may, in various examples, send packet data 214E that is associated with the packet 212 to the computing resource 112A. The computing resource 112A may store the packet data 214E. The packet data 214E may include timestamp data (e.g., ingress and egress timestamp data for leaf switch 108B) and at least one of a TCP sequence number, a 5-tuple flow, an IP header identification field, and/or the like.

When the packet 212 is received by leaf switch 108D, the packet 212 may comprises a new packet header and not easily be recognized by the computing resource 112A as the same packet 212 that was exported by leaf switch 108C. However, based at least in part on the stored packet data 214D and the stored packet data 214E, the computing resource 112A may determine that the packet 212 that was received by the leaf switch 108D is the same packet 212 that was exported by leaf switch 108C, even though the IP header has changed. Accordingly, using at least the egress timestamp from stored packet data 214D (egress timestamp of leaf switch 108C) and the ingress timestamp from stored packet data 214E (ingress timestamp of leaf switch 108D), the computing resource 112A may determine a latency associated with the service chain device 114B processing the packet 212. Additionally, using at least the timestamp data from packet data 214E, a latency may be calculated for the leaf switch 108D. The latency may indicate an amount of time it took for leaf switch 108D to process and forward the packet 212 to spine switch 110B.

At "6", spine switch 110B receives the packet 212 of data flow 210 from the leaf switch 108D and forwards the packet 212 to leaf switch 108E. The spine switch 110B may, in various examples, send packet data 214F that is associated with the packet 212 to the computing resource 112A. The computing resource 112A may store the packet data 214F.

The packet data 214F may include timestamp data (e.g., ingress and egress timestamp data for spine switch 110A) and at least one of a TCP sequence number, a 5-tuple flow, an IP header identification field, and/or the like. Using at least the timestamp data, a latency may be calculated for the spine switch 110B. The latency may indicate an amount of time it took for spine switch 110B to process and forward the packet to leaf switch 108E and/or may include the amount of time since the packet entered the networked computing environment on leaf switch 108D. The latency may be calculated by determining a difference between a local time when spine switch 110A received the packet and the timestamp value of when the packet entered the networked computing environment on leaf switch 108D.

At "7", leaf switch 108E receives the packet 212 of data flow 210 from the spine switch 110B and exports the packet 212 outside of the networked computing environment 102 to one or more networks 122 (e.g., internet). The leaf switch 108E may, in various examples, send packet data 214G that is associated with the packet 212 to the computing resource 112A. The computing resource 112A may store the packet data 214G. The packet data 214G may include timestamp data (e.g., ingress and egress timestamp data for leaf switch 108A) and at least one of a TCP sequence number, a 5-tuple flow, an IP header identification field, and/or the like. Using at least the timestamp data, a latency may be calculated for the leaf switch 108E. The latency may indicate an amount of time it took for leaf switch 108E to process and export the packet to the one or more networks 122 and/or may include the amount of time since the packet entered the networked computing environment on leaf switch 108D. The latency may be calculated by determining a difference between a local time when leaf switch 108E received the packet and the timestamp value of when the packet entered the networked computing environment on leaf switch 108D.

Additionally, the computing resource 112A may calculate an end-to-end latency associated with the packet 212 traversing the entire data flow 210 of the networked computing environment 102. The end-to-end latency may be calculated based at least in part on summing all of the latencies calculated for the individual devices and/or segments of the data flow 210 as described above. Additionally, or alternatively, the end-to-end latency may be calculated by determining a difference between the ingress timestamp of when leaf switch 108A received the packet 212 and the egress timestamp of when leaf switch 108E exported the packet 212 to the one or more networks 122.

FIGS. 3 and 4 illustrate a flow diagrams of example methods that illustrate aspects of the functions performed at least partly by the various devices as described in FIGS. 1-2C. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for determining a latency associated with a packet traversing a data flow of a networked computing environment that utilizes service chaining.

The method 300 begins at step 302, during which first timestamp data is received from an ingress leaf switch of a networked computing environment. The first timestamp data may indicate a first time at which a packet entered a data flow of the networked computing environment. In various examples, the ingress leaf switch may correspond to leaf switch 108A in FIGS. 1-2C. The first timestamp data may be received by a computing resource of the networked computing environment, such as computing resource 112A. Additionally, or alternatively, the first timestamp data may be received by another device of the networked computing environment, such as a switch, router, computer, or other device that is capable of executing software to determine packet paths and latencies of a data flow.

At 304, the method 300 includes receiving, from a first intermediary leaf switch in the networked computing environment, first flow data associated with the data flow. In some examples, the first intermediary leaf switch may correspond to leaf switch 108B or 108C of FIGS. 1-2C. The first flow data may include one or more of a VRF table, 5-tuple flow data, ingress and/or egress physical interface data, ingress and/or egress logical interface data, service chain configuration data, next-hop information, a TCP sequence number, an IP header identification field, etc. The first flow data may be received by a computing resource of the networked computing environment, such as computing resource 112A.

At 306, the method 300 includes determining, based at least in part on the first flow data, that the first intermediary leaf switch is configured to export the packet to a service chain device located outside of the networked computing environment. For instance, the first flow data may indicate that packets associated with the data flow which are received by the first intermediary leaf switch are to be exported to the service chain device. In some examples, the service chain device may correspond to service chain device 114A or 114B of FIGS. 1-2C. The service chain device may comprise a firewall, TCP optimizers, CGNAT, parental control, DPI, load balancers, and the like.

At 308, the method 300 includes receiving, from a second intermediary leaf switch in the networked computing environment, second flow data associated with the data flow. In some examples, the second intermediary leaf switch may correspond to leaf switch 108C or 108D of FIGS. 1-2C. The second flow data may include one or more of a VRF table, 5-tuple flow data, ingress and/or egress physical interface data, ingress and/or egress logical interface data, service chain configuration data, next-hop information, a TCP sequence number, an IP header identification field, etc. The second flow data may be received by a computing resource of the networked computing environment, such as computing resource 112A.

At 310, the method 300 includes determining, based at least in part on the second flow data, that the second intermediary leaf switch received the packet as it returned back into the networked computing environment from the service chain device. For instance, the second flow data may indicate that packets associated with the data flow which are received by the second intermediary leaf switch were sent by the service chain device. Additionally, or alternatively, the second flow data may include data that corresponds with the first flow data, such as a TCP sequence number, 5-tuple flow data, IP header identification field, etc. In this way, determining that the second intermediary leaf switch received the packet may be based at least in part on first data of the first flow data corresponding with second data of the second flow data. For instance, the first data and the second data may include the same IP header identification field, the same TCP sequence number, and/or the like.

At 312, the method 300 includes receiving, from an egress leaf switch of the networked computing environment, second timestamp data indicating a second time at which the packet exited the data flow of the networked computing environment. In various examples, the egress leaf switch may correspond to leaf switch 108N and/or 108E in FIGS. 1-2C. The second timestamp data may be received by the computing resource of the networked computing environment, such as computing resource 112A. Additionally, or alternatively, the second timestamp data may be received by another device of the networked computing environment, such as a switch, router, computer, or other device that is capable of executing software to determine packet paths and latencies of a data flow.

At 314, the method 300 includes calculating a latency associated with the packet traversing the data flow of the networked computing environment based at least in part on the first timestamp data and the second timestamp data. For instance, a difference can be calculated between the first timestamp data and the second timestamp data to determine the latency. Additionally, or alternatively, individual latencies associated with various devices and/or segments of the data flow may be determined and summed together to calculate the latency.

In some examples, if the latency is greater than a threshold latency, one or more devices of the data flow that are causing an extended latency may be identified. In this way, the packet path of the data flow can be adjusted to exclude the one or more devices causing the extended latency, or the one or more devices can be repaired or replaced.

FIG. 4 illustrates a flow diagram of an example method 400 for determining a latency associated with a service chain device. The method 400 may be implemented by one or more of the devices noted above with respect to FIGS. 1-2C, as well as other devices not shown in FIGS. 1-2C.

At 402, the method 400 includes receiving, from a first leaf switch of a networked computing environment, first flow data that is associated with a data flow. The first flow data may include one or more of a VRF table, 5-tuple flow data, ingress and/or egress physical interface data, ingress and/or egress logical interface data, service chain configuration data, next-hop information, a TCP sequence number, an IP header identification field, etc. The first flow data may indicate one or more next-hops for packets that are routed through the first leaf switch.

At 404, the method 400 includes receiving, from a second leaf switch of the networked computing environment, second flow data that is associated with the data flow. Like the first flow data, the second flow data may include one or more of a VRF table, 5-tuple flow data, ingress and/or egress physical interface data, ingress and/or egress logical interface data, service chain configuration data, next-hop information, a TCP sequence number, an IP header identification field, and the like. The second flow data may indicate one or more next-hops for packets that are routed through the second leaf switch.

At 406, the method 400 includes determining, based at least in part on the first flow data and the second flow data, a packet path that is associated with the data flow, the packet path indicating that the first leaf switch is configured to send packets to a service chain device and that the second leaf switch is configured to receive the packets from the service chain device. In some examples, the service chain device is located outside of the networked computing environment. The service chain device may comprise a firewall, TCP optimizers, CGNAT, parental control, DPI, load balancers, and the like.

At 408, the method 400 includes receiving, from the first leaf switch, first timestamp data indicating a first time at which a packet was sent to the service chain device. For instance, the first timestamp data may correspond with a time of egress associated with the first leaf switch sending the packet. At 410, the method 400 includes receiving, from the second leaf switch, second timestamp data indicating a second time at which the packet was received from the service chain device. For instance, the second timestamp data may correspond with a time of ingress associated with the second leaf switch receiving the packet.

At 412, the method 400 includes calculating a latency associated with the service chain device based at least in part on the first timestamp data and the second timestamp data. For example, a difference may be calculated between the first timestamp data and the second timestamp data in order to determine the latency. Additionally, calculating the latency may further be based at least in part on the packet path associated with the data flow. For instance, the packet may comprise a new packet header when it is received by the second leaf switch, and the IP header identification field, TCP sequence number, and/or the like may be used to determine that the received packet is the same packet that was sent to the service chain device by the first leaf switch. Further, calculating the latency may even further be based at least in part on receiving, from the first leaf switch and the second leaf switch, packet identification data associated with the packet. The packet identification data may include, in some examples, 5-tuple flow data, a TCP sequence number, an IP header identification field, and the like.

Figure 5:
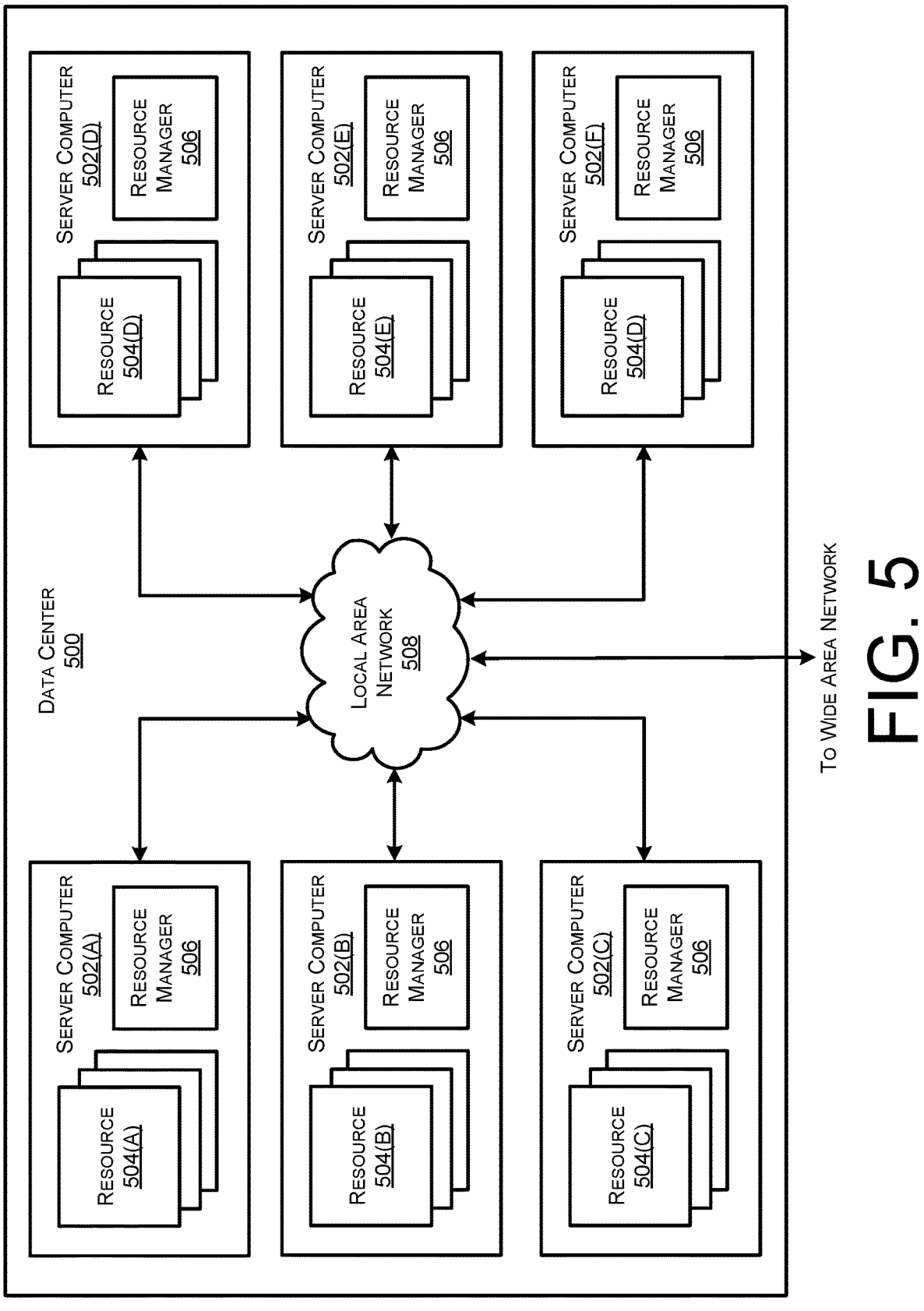
FIG. 5 illustrates a computing system diagram of an example configuration for a data center that can be utilized to implement aspects of the technologies disclosed herein.

FIG. 5 illustrates a computing system diagram illustrating a configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, the any type of computing device described herein. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, VPNs, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some instances, the data center 500 may provide computing resources, like packet path visibility, packet drop, latency measurements, VM instances, VPN instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like tenant containers and VM instances, data storage resources, networking resources, data communication resources, network services, VPN instances, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
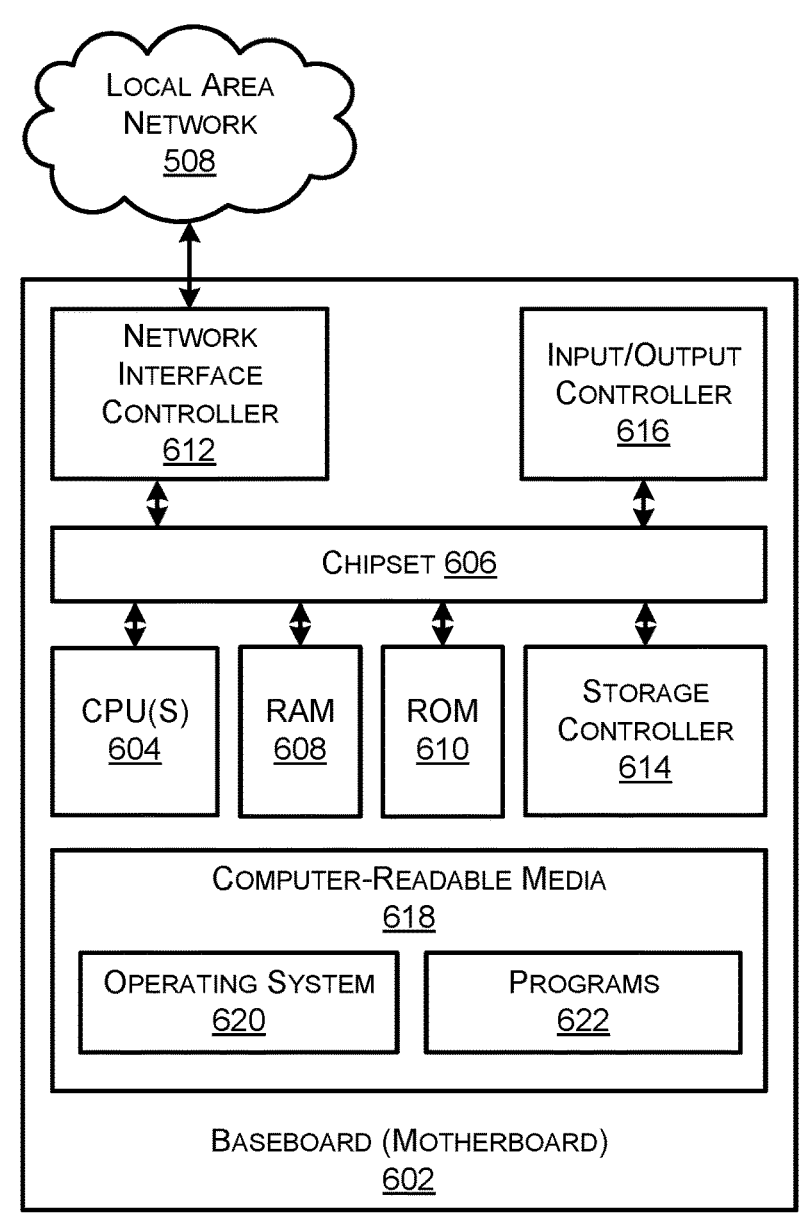
FIG. 6 illustrates a computer architecture diagram showing an example computer hardware architecture for implementing a network device that can be utilized to implement aspects of the various technologies presented herein.

FIG. 6 illustrates a computer architecture diagram showing an example computer hardware architecture 600 for implementing a computing device that can be utilized to implement aspects of the various technologies presented herein. The computer hardware architecture 600 shown in FIG. 6 illustrates a conventional server computer 502, computing resource 112A-112N, network device (e.g., leaf switch 108A-108N, spine switch 110A-110N, service chain device 114A-114N, etc.), workstation, desktop computer, laptop, tablet, network appliance, e-reader, smartphone, or other computing device, and can be utilized to execute any of the software components presented herein. The computer 600 may, in some examples, correspond to a network device 102 described herein, and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 106. The chipset 606 can include functionality for providing network connectivity through a Network Interface Controller (NIC) 612, such as a gigabit Ethernet adapter. The NIC 612 is capable of connecting the computer 600 to other computing devices over the network 106. It should be appreciated that multiple NICs 612 can be present in the computer 600, connecting the computer to other types of networks and remote computer systems. In some examples, the NIC 612 may be configured to perform at least some of the techniques described herein, such as packet redirects and/or other techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 106 and or any components included therein, may be supported by one or more devices similar to computer 600. Stated otherwise, some or all of the operations performed by the network 106, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a client device 106 or a network device (e.g., server computer 502, computing resource 114, router 110, etc.). The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the client devices 106 and computing resources 114 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for determining packet path visibility, packet drops, and latency measurements associated with data flows of a networked computing environment that utilizes service chaining. The programs 622 may enable the leaf switches 108, the spine switches 110, and/or the computing resources 112 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

determining, based at least in part on flow data and service chain configuration data associated with network switches of a data center fabric, a path that packets of a data flow are to traverse, the path including at least:

a first hop between a first network switch of the data center fabric and a service node disposed outside of the data center fabric, the first network switch configured to egress the packets from the data center fabric to the service node; and a second hop between a second network switch of the data center fabric and the service node, the second network switch configured to ingress the packets into the data center fabric from the service node;

receiving, from the first network switch, header data that was included with a packet of the data flow when the packet was sent, to the service node, by the first network switch;

receiving, from the second network switch, different header data that was included with the packet of the data flow when the packet was received, from the service node, by the second network switch;

determining, based at least in part on the path, that the packet received at the second network switch is the packet that was sent to the service node by the first network switch; and calculating, based at least in part on the header data and the different header data, a latency associated with the service node.

2. The method of claim 1, wherein the header data includes a first timestamp and the different header data includes a second timestamp, the latency calculated based at least in part on a difference between the first timestamp and the second timestamp.

3. The method of claim 1, wherein the header data and the different header data comprise at least one of a TCP sequence number, an internet protocol (IP) header identification field, or a 5-tuple flow identifier.

4. The method of claim 1, further comprising determining an end-to-end latency associated with the packet traversing the path based at least in part on the latency associated with the service node.

5. The method of claim 1, wherein the service chain configuration data comprises at least one of:

a contract associated with the data center fabric;

a filter associated with the data center fabric;

a service graph configuration associated with the data center fabric;

a policy-based routing configuration associated with the data center fabric; or a routing protocol configuration associated with the data center fabric.

6. The method of claim 1, wherein determining the path comprises determining, based on the service chain configuration data and for each one of the network switches of the data center fabric, a next hop for the packets of the data flow traversing the path, the first hop immediately preceding the second hop.

7. The method of claim 1, wherein determining that the packet received at the second network switch is the packet that was sent to the service node by the first network switch is further based at least in part on a network 5-tuple included in the header data and the different header data.

8. A system comprising:
one or more processors; and
one or more non-transitory computer-readable media storing instructions that, when executed, cause the one or more processors to perform operations comprising:
determining, based at least in part on flow data and service chain configuration data associated with network switches of a data center fabric, a path that packets of a data flow are to traverse, the path including at least:
first hop between a first network switch of the data center fabric and a service node disposed outside of the data center fabric, the first network switch configured to egress the packets from the data center fabric to the service node; and
a second hop between a second network switch of the data center fabric and the service node, the second network switch configured to ingress the packets into the data center fabric from the service node;
receiving, from the first network switch, header data that was included with a packet of the data flow when the packet was sent, to the service node, by the first network switch;
receiving, from the second network switch, different header data that was included with the packet of the data flow when the packet was received, from the service node, by the second network switch;
determining, based at least in part on the path, that the packet received at the second network switch is the packet that was sent to the service node by the first network switch; and
calculating, based at least in part on the header data and the different header data, a latency associated with the service node.

9. The system of claim 8, wherein the header data includes a first timestamp and the different header data includes a second timestamp, the latency calculated based at least in part on a difference between the first timestamp and the second timestamp.

10. The system of claim 8, wherein the header data and the different header data comprise at least one of a TCP sequence number, an internet protocol (IP) header identification field, or a 5-tuple flow identifier.

11. The system of claim 8, the operations further comprising determining an end-to-end latency associated with the packet traversing the path based at least in part on the latency associated with the service node.

12. The system of claim 8, wherein the service chain configuration data comprises at least one of:
a contract associated with the data center fabric;
a filter associated with the data center fabric;
a service graph configuration associated with the data center fabric;
a policy-based routing configuration associated with the data center fabric; or
a routing protocol configuration associated with the data center fabric.

13. The system of claim 8, wherein determining the path comprises determining, based on the service chain configuration data and for each one of the network switches of the data center fabric, a next hop for the packets of the data flow traversing the path.

14. The system of claim 8, wherein determining that the packet received at the second network switch is the packet that was sent to the service node by the first network switch is further based at least in part on a network 5-tuple included in the header data and the different header data.

15. One or more non-transitory computer-readable media storing instructions that, when executed, cause one or more processors to perform operations comprising:
determining, based at least in part on flow data and service chain configuration data associated with network switches of a data center fabric, a path that packets of a data flow are to traverse, the path including at least:
a first hop between a first network switch of the data center fabric and a service node disposed outside of the data center fabric, the first network switch configured to egress the packets from the data center fabric to the service node; and
a second hop between a second network switch of the data center fabric and the service node, the second network switch configured to ingress the packets into the data center fabric from the service node;
receiving, from the first network switch, header data that was included with a packet of the data flow when the packet was sent, to the service node, by the first network switch;
receiving, from the second network switch, different header data that was included with the packet of the data flow when the packet was received, from the service node, by the second network switch;
determining, based at least in part on the path, that the packet received at the second network switch is the packet that was sent to the service node by the first network switch; and
calculating, based at least in part on the header data and the different header data, a latency associated with the service node.

16. The one or more non-transitory computer-readable media of claim 15, wherein the header data includes a first timestamp and the different header data includes a second timestamp, the latency calculated based at least in part on a difference between the first timestamp and the second timestamp.

17. The one or more non-transitory computer-readable media of claim 15, the operations further comprising determining an end-to-end latency associated with the packet traversing the path based at least in part on the latency associated with the service node.

18. The one or more non-transitory computer-readable media of claim 15, wherein the service chain configuration data comprises at least one of:
a contract associated with the data center fabric;
a filter associated with the data center fabric;
a service graph configuration associated with the data center fabric;
a policy-based routing configuration associated with the data center fabric; or
a routing protocol configuration associated with the data center fabric.

19. The one or more non-transitory computer-readable media of claim 15, wherein determining the path comprises determining, based on the service chain configuration data and for each one of the network switches of the data center fabric, a next hop for the packets of the data flow traversing the path.

20. The one or more non-transitory computer-readable media of claim 15, wherein determining that the packet received at the second network switch is the packet that was sent to the service node by the first network switch is further based at least in part on a network 5-tuple included in the header data and the different header data.

\* \* \* \* \*